Oct. 2, 1951 H. S. WOODRUFF 2,569,877
THERMOSTATICALLY CONTROLLED VAPORIZING FUEL BURNER
Filed April 5, 1949 5 Sheets-Sheet 3

INVENTOR
HENRY S. WOODRUFF
BY
Burgess Ryan & Hicks
ATTORNEYS

Oct. 2, 1951 H. S. WOODRUFF 2,569,877
THERMOSTATICALLY CONTROLLED VAPORIZING FUEL BURNER
Filed April 5, 1949 5 Sheets-Sheet 4

INVENTOR
HENRY S. WOODRUFF
BY
Burger Ryan & Hicks
ATTORNEYS

Oct. 2, 1951 H. S. WOODRUFF 2,569,877
THERMOSTATICALLY CONTROLLED VAPORIZING FUEL BURNER
Filed April 5, 1949 5 Sheets-Sheet 5

INVENTOR
HENRY S. WOODRUFF
BY
ATTORNEYS

Patented Oct. 2, 1951

2,569,877

UNITED STATES PATENT OFFICE 2,569,877

THERMOSTATICALLY CONTROLLED VAPORIZING FUEL BURNER

Henry S. Woodruff, Cazenovia, N. Y., assignor to The Variflame Corporation, White Plains, N. Y., a corporation of New York Application April 5, 1949, Serial No. 85,631

9 Claims. (Cl. 236—73)

This application is a continuation-in-part of my application, Serial No. 761,317, filed July 16, 1947, now abandoned.

The invention relates to pot type, vaporizing oil burners in which a continuous flame is maintained, the fuel supply being increased or decreased to enlarge or diminish the flame in accordance with the needs of the space to be heated, as registered by a room thermostat.

The primary object of the invention is a burner of this type in which, within a convenient, self-contained unit, appropriate control mechanism is provided for accurately modulating the fuel supply and, coincidently, the supply of air appropriate for the clean combustion of the particular amount of fuel being delivered at any time. As will appear, the unit includes a matering pump for the fuel, a fan, a single motor for operating both of them and the entire modulating mechanism, all organized for ease of assembly and safe, reliable operation.

In the accompanying drawings, which illustrate a preferred embodiment of the invention:

Fig. 7 is a wiring diagram.

Figure 1:
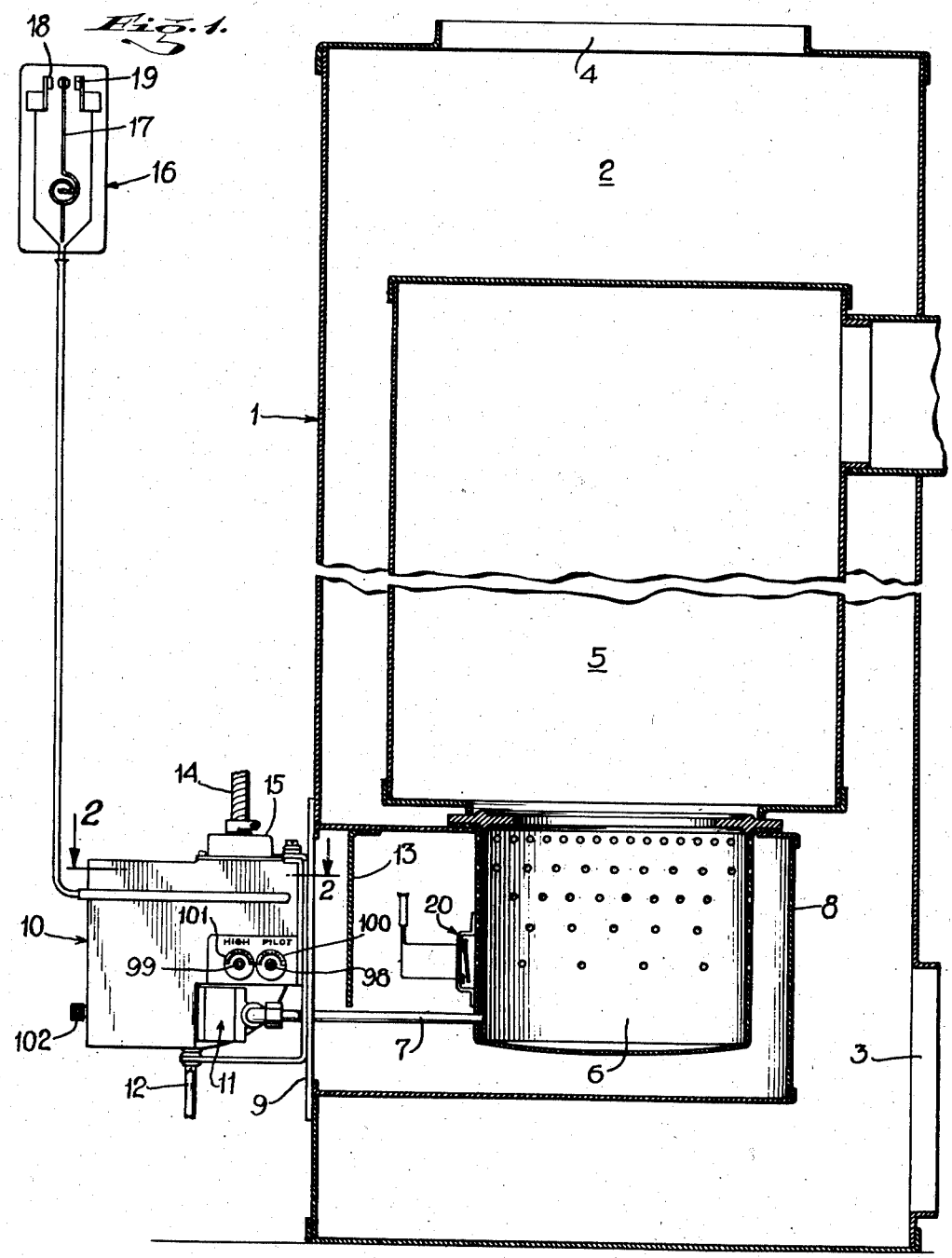
Fig. 1 is an elevational view, partially sectioned and in part diagrammatic, of a furnace installation incorporating the invention.

Referring first to Fig. 1 of the drawings, there is shown more or less diagrammatically a hot air furnace generally designated 1, including an air heating chamber 2, having the usual bottom inlet 3 and top outlet 4. Within the heating chamber is the combustion chamber 5, beneath which is mounted the burner pot 6, having a perforated wall for the admission of combustion air and the usual dished bottom, which latter serves to cause the surface area of the oil pool to contract as the oil supply is reduced, and to cause it to expand as the oil supply is increased. The oil supply line to the burner pot is indicated at 7. The burner pot is mounted within as enclosure 8 which is closed at the front of the furnace by a plate 9 on which is mounted the complete mechanism unit, generally designated 10. As below described in greater detail, this unit includes a pump 11 which serves to meter oil to supply line 7 from feed line 12, and a fan which discharges into enclosure 8 to supply the combustion air, both the pump and the fan being driven by a single motor. As shown in Fig. 1, a baffle 13 is located to intercept the fan-supplied air and divert it around the burner pot, so that it will enter the pot through the various apertures spaced around it rather than impinge directly on the near side wall of the pot.

A house current supply cable 14 is indicated passing into a transformer 15, the primary circuit of which operates the motor for driving the fan and oil pump as presently described, and the secondary circuit of which transformer is utilized to operate the controls to be described, whereby the oil supply and the air supply are coincidentally modulated in accordance with the thermal conditions obtaining in the space to be heated, in which is located a room thermostat 16. The arrangement is such that when the bi-metal element 17 of the thermostat engages contact 18, the controls are operative to increase the air and fuel supplies to the burner pot; and when the element 17 engages contact 19, the controls are operative to reduce the air and oil supply to the burner pot.

In Fig. 1 there is also shown a thermostatic pot switch 20, which, as mentioned below, is in series with the motor and is biased to open and break the motor circuit in the event the flame in the pot should be extinguished. As long as fuel is burning in the pot, switch 20 remains closed.

Figure 2:
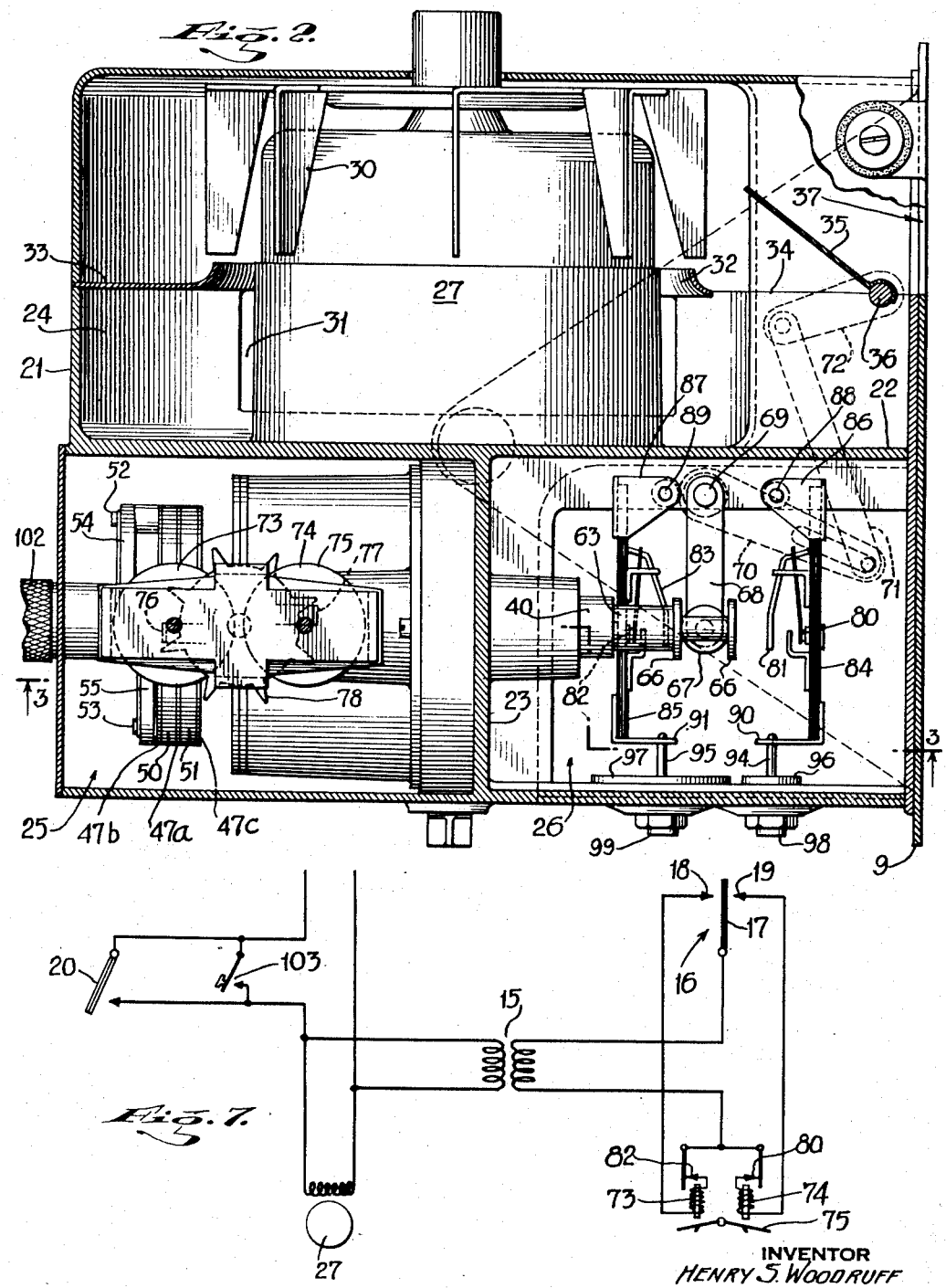
Fig. 2 is an enlarged scale, horizontal section, on the line 2—2 of Fig. 1.
Figure 3:
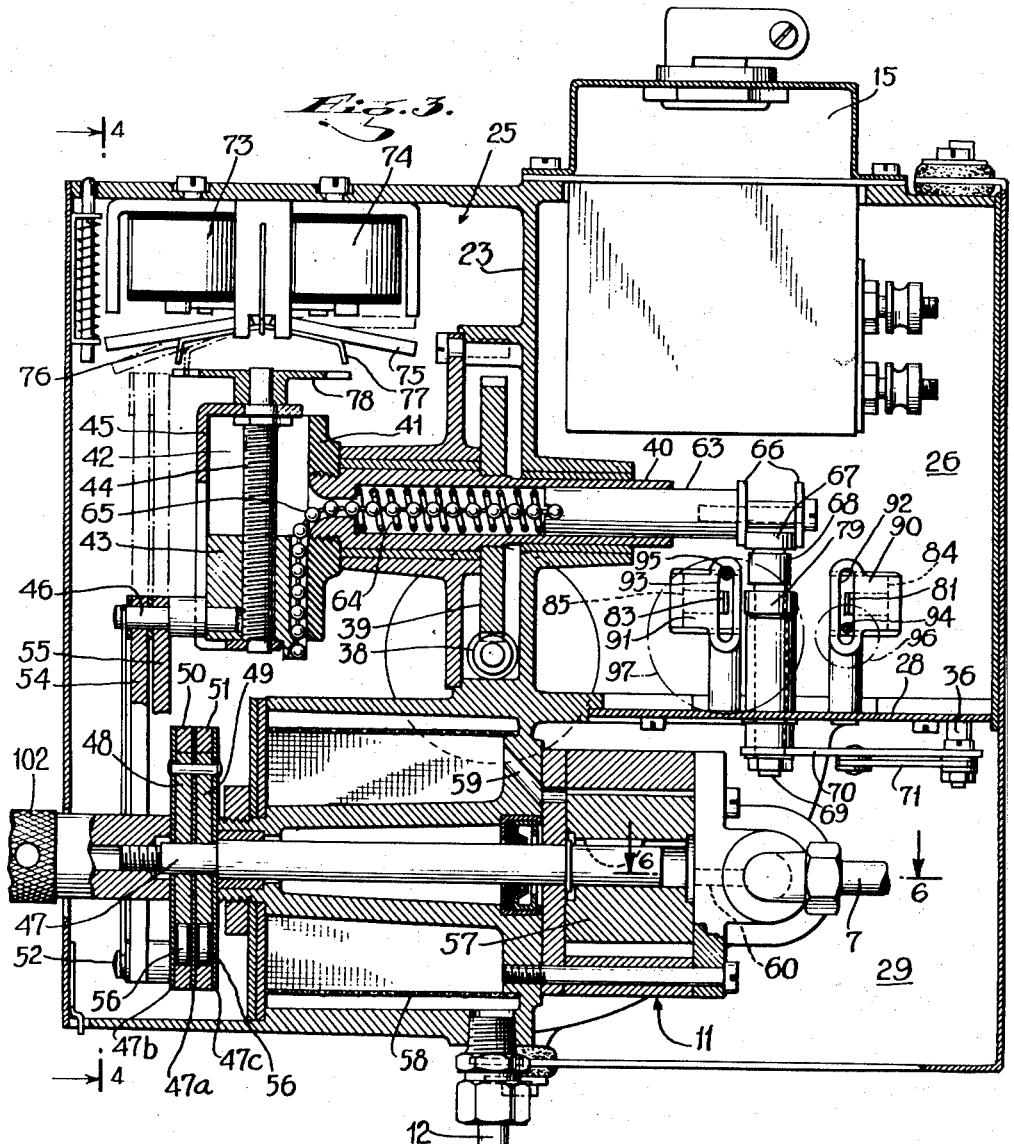
Fig. 3 is a vertical section, on the line 3—3 of Fig. 2.

Referring particularly to Fig. 2, it will be seen that the mechanism unit 10 includes a housing or enclosure 21, subdivided by partitions or interior walls 22 and 23 into three main compartments 24, 25 and 26. Compartment 24 houses the single motor 27 by which both the fuel metering pump and the fan are driven. Compartment 25 in general houses the controls for the pump. As shown in Fig. 3, a plate 28 forms the lower wall of compartment 26, and in the space 29 below wall 28 the fuel pump 11 is located. In compartment 26 are located the coupling mechanism by which the fan discharge is controlled and also certain limit switch controls, later to be described.

Figure 5:
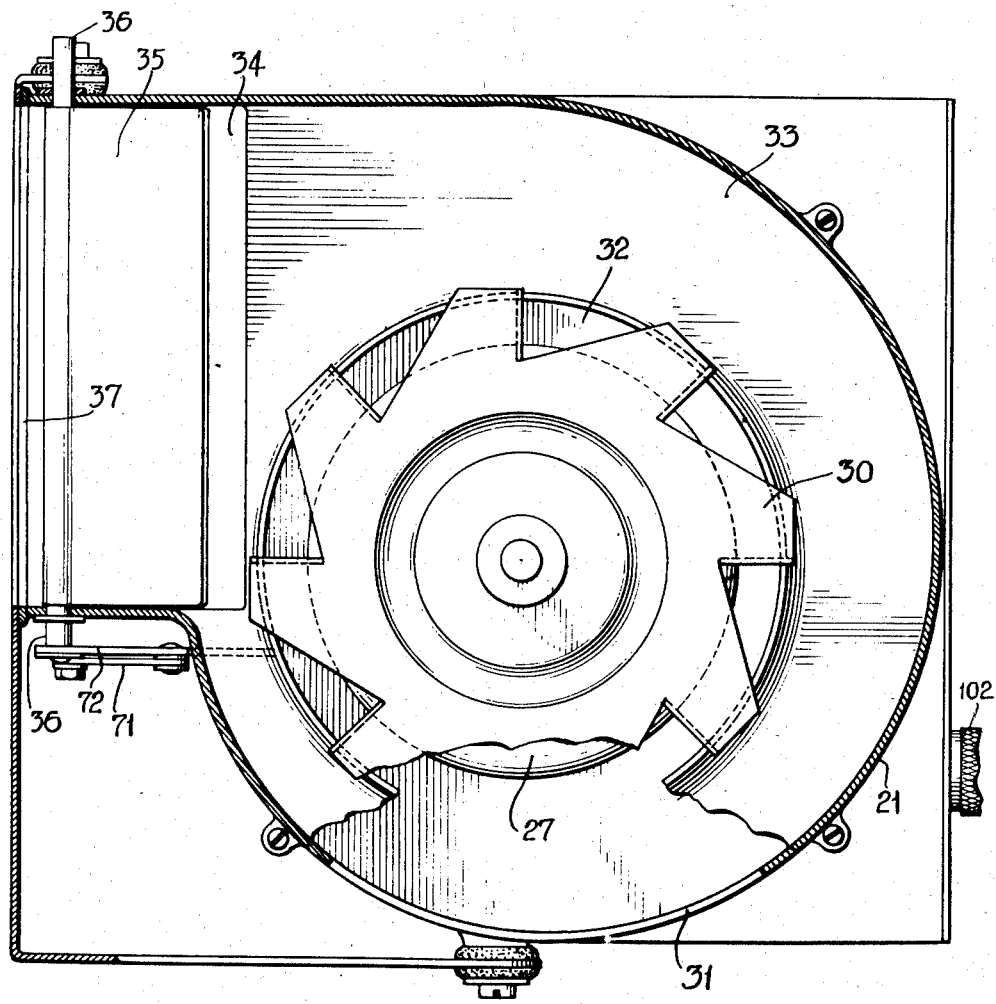
Fig. 5 is a vertical section, on the line 5—5 of Fig. 4.

As shown in Figs. 2 and 5, the fan 30 is mounted directly on the shaft of motor 27. The air inlet 31 for the fan is located in the bottom wall of chamber 24, directly beneath the motor, so that the incoming air is drawn across the latter to cool it. The incoming air is drawn through the annular opening 32 in fan orifice plate 33, which plate incorporates a by-pass opening 34 arranged to be controlled by a damper 35. The damper is arranged to swing about the axis of a vertical hinge post 36, so as to permit more or less of the air discharged by the fan to enter by-pass opening 34 and be recirculated through opening 32. The amount of air not so by-passed is discharged through outlet 37 into the burner pot enclosure 8.

Figure 4:
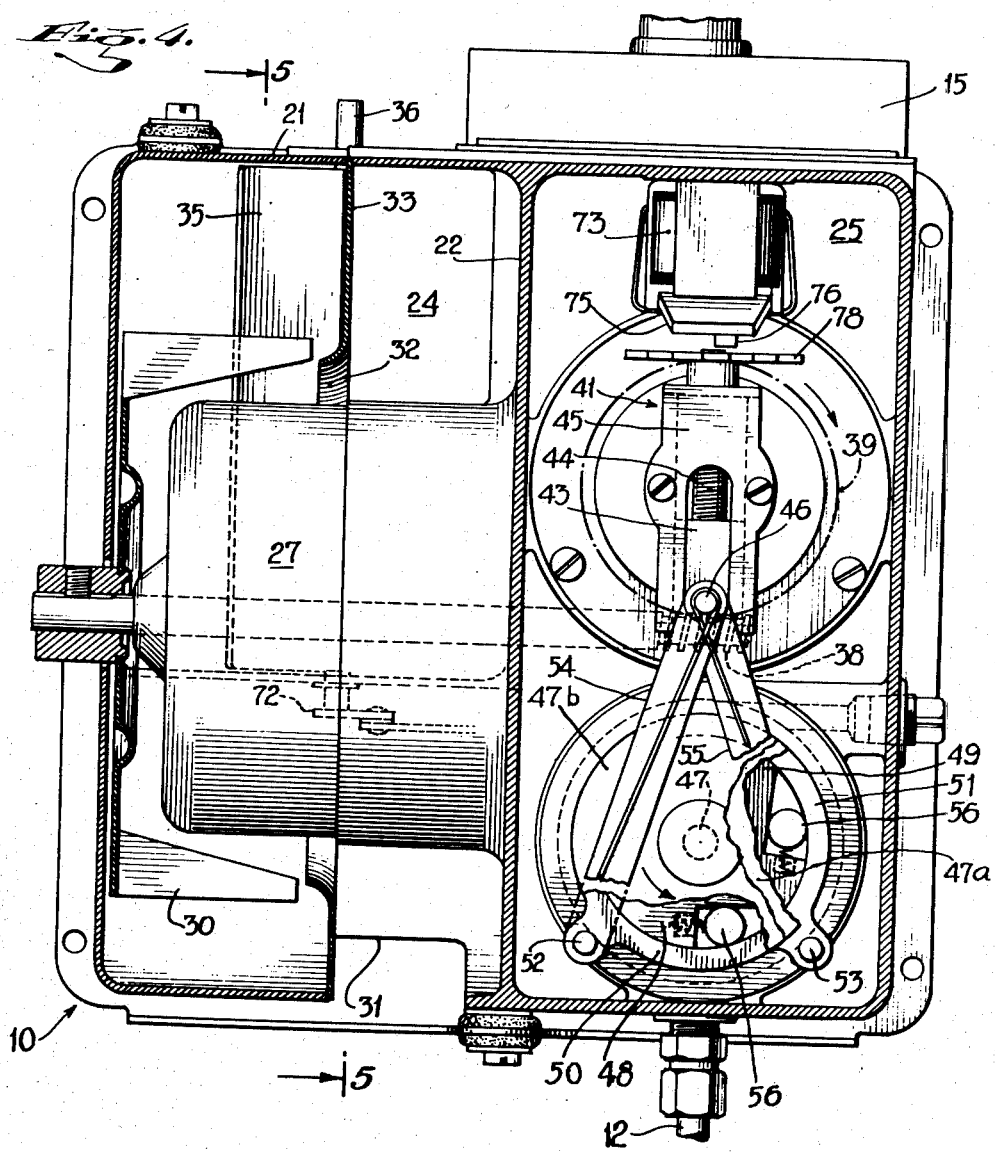
Fig. 4 is a vertical section, on the line 4—4 of Fig. 3.

Referring particularly to Figs. 3 and 4, it will be seen that, on its end remote from the fan, the motor shaft carries a worm 38 which drives a worm wheel 39 which is secured to a hollow shaft 40. At its left-hand end (as viewed in Fig. 3), shaft 40 carries a cross-head 41, and in transverse channel 42 in the cross-head is mounted a crank pin block 43 which is radially adjustable in response to rotation of a feed screw 44 which is journaled at its ends in channel cover 45. Block 43 carries crank pin 46, from which the fuel pump shaft 47 is driven through an appropriate ratchet arrangement. In the form of drive illustrated, a central plate 47a, outside plates 47b and 47c and intervening discs 48, 49, are all riveted or otherwise secured together to rotate as a unit with shaft 47; and rings 50, 51 are mounted to rotate about the shaft axis in the peripheral channels between plates 47a, 47b and 47c. Ears projecting from rings 50, 51 carry studs 52, 53 respectively, which studs are coupled by links 54, 55 with crank pin 46; and the discs 48, 49 are formed with recesses to accommodate friction drive rollers 56 which are spring-biased outwardly to couple the discs to their respective rings in one direction of rotation of the discs and to "ratchet" in the opposite direction. As will be understood, the ring-disc drives thus function alternately, so that, as the crank pin is rotated by hollow shaft 40, substantially continuous rotation is imparted to pump drive shaft 47. However, as will be apparent, the throw of crank pin 46, and hence the rotation of shaft 47, will vary, depending upon the position of block 43 on feed screw 44, maximum rotation being imparted to shaft 47 when block 43 is at the outward limit of radial movement, and minimum rotation of shaft 47 being imparted when block 43 is at the inner limit of its radial movement.

As shown particularly in Fig. 3, the fuel pump 11 is located at the end of shaft 47 remote from the ratchet drive, and in this instance, a sliding vane type of pump is contemplated, including a rotor 57 keyed directly to shaft 47. By the use of such type of pump the fuel supply is under constant and accurate control as to the amount of fuel metered to the burner pot. The incoming fuel supplied through feed line 12 passes through filter 58 and inlet 59 to the pump and from the pump through outlet 60 to line 7 to the burner pot.

Figure 6:
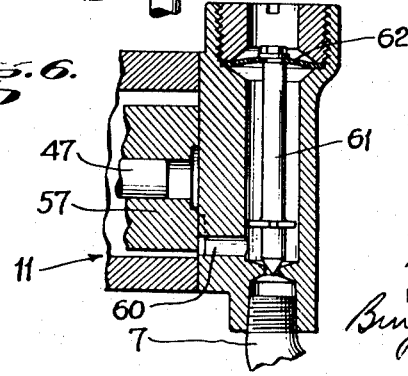
Fig. 6 is a horizontal section, on the line 6—6 of Fig. 3.

As shown in Fig. 6, the flow of fuel from outlet 60 to line 7 is preferably controlled by an automatic shutoff valve, including a needle 61 supported by a resilient diaphragm 62 which yields to open the needle valve under the pressure of the oil passing through outlet 60 from the pump but which, when the pump stops, serves to close the needle valve. Thus, when the pump is at rest, there is no possibility of flooding the pot as the result of oil inadvertently flowing to it.

In accordance with the present invention, the amount of air passed to the burner by the fan is modulated in accordance with the oil supply; and, to that end, a coupling is provided between the radially adjustable crank pin block 43 and damper 35.

As shown in Fig. 3, a rod 63 is mounted to slide in hollow shaft 40, being biased outwardly or to the right by spring 64; and rod 63 is coupled to block 43, as by bead chain 65. Thus, as block 43 moves radially inwardly or outwardly in response to rotation of feed screw 44, so rod 63 moves outwardly (to the right) or inwardly, and this movement is utilized to vary the setting of the damper, as follows:

Between spaced collars 66 on the end of rod 63 is located a roller 67 carried on the end of arm 68 which is secured to post 69; and on the other end of post 69 is a crank 70 which, through link 71, is connected to crank 72 secured to damper post 36. As will be understood, radial movement of crank pin block 43 outwardly to increase the fuel supply rotates damper post 36 counterclockwise, as viewed in Fig. 2, so as to increase the amount of fan air passing to the burner, and reverse movement of block 43, to decrease the fuel supply, rotates damper post 36 clockwise to decrease the air supply; that is, by increasing the amount of air discharged through by-pass opening 34.

Magnetic means are provided for bringing about and controlling the direction of rotation of feed screw 44. As shown, such means include two solenoids 73, 74, which operate an armature 75 pivoted about its center and normally (that is, when neither solenoid is energized) occupying the full line position illustrated. The armature has two depending lugs 76, 77, one or the other of which, when the armature is rocked by the energizing of one or the other of the solenoids, projects into the path of a star wheel 78 which is secured to the end of feed screw 44. In the neutral or full line position of the armature 75, as shown in Fig. 3, lugs 76, 77 are both clear of the star wheel; and as long as the armature continues in this position, crank pin block 43 occupies a fixed position with respect to crosshead 41, and rotation of shaft 40 results in a constant feed of oil and air to the burner commensurate with the then position of crank pin block 43. However, when solenoid 74, for example, is energized, armature 75 is rocked into its dotted line position, and lug 76 is projected into the path of the star wheel. In the result, the star wheel and feed screw 44 are rotated one step for each complete turn of shaft 40, and thus a gradual adjustment of the radial position of block 43 is effected, thereby bringing about a gradual change in the fuel and air supply through the drive and connections above described. In this instance, solenoid 74 is energized in response to the engagement of thermostat element 17 with contact 19, which represents a call for less heat. Accordingly, in the sequence just described, the star wheel and feed screw are rotated in a direction to move crank pin block 43 radially inwardly and thereby reduce the fuel and air supply. As will be understood, solenoid 73 is energized in response to the engagement of thermostat element 17 with contact 18, which represents a call for more heat; and when that occurs, armature 75 is rocked to bring lug 77 into position to be engaged by the star wheel. Thereupon the star wheel and feed screw 44 are rotated in the opposite direction, and crank pin block 43 is closed to move radially outward to increase the fuel and air supply.

As will be understood, the burner motor runs continuously; and, as long as the room thermostat is calling for heat, the magnetic control will continue to hold armature 75 biased to a position tending to continue the slow, outward movement of block 43 to increase the fuel and air supply. Similarly, the slow inward movement of block 43 to decrease the fuel and air supply will tend to continue as long as the room thermostat is calling for less heat. Since the thermostat may be calling for more heat, or less heat, even when the block 43 has reached the permissible limits of its radial movement, means are provided for arresting movement of the block at predetermined limit positions, representing predetermined maximum and minimum rates of oil supply.

For the foregoing purpose, two micro-switches are employed arranged, respectively, in series with the coils of solenoids 73, 74 and arranged to be opened at predetermined limits of travel of rod 63. As shown in Fig. 3, a second roller 79 is mounted on the underside of arm 68, directly beneath roller 67, which second roller is adapted to effect the opening of one or the other of the micro-switches after arm 68 has swung to its predetermined limit position in either direction. The switches are of well-known construction and hence are illustrated more or less diagrammatically in Fig. 2. As there shown, the contacts of the right-hand switch are marked 80 and the switch actuator 81. As is customary with switches of this type, the contacts are normally closed. They snap open when pressure is applied to actuator 80 and re-close when the pressure is released. The contacts of the left-hand switch (shown dotted) are marked 82 and their actuator 83. Thus, as arm 68 reaches the desired limit position, to the right or to the left (in response to the movement of rod 63) roller 79, which is directly beneath roller 67, as viewed in Fig. 2, will effect the opening of one or the other of the micro-switches.

As shown in the wiring diagram, Fig. 7, the micro-switches are in series, respectively, with the solenoid coils. When, as the result of continued engagement of thermostat element 17 with either contact 18 or contact 19, the inward or outward limit position of rod 63 is reached, micro-switch contacts 82 or 80 will be snapped open so as to de-energize the then active solenoid, 73 or 74. Thereupon, armature 75 returns to its normal or inactive position clear of star wheel 78. Thereafter, the burner continues to operate at its maximum or minimum fuel and air supply setting. Eventually, thermostat element 17 returns to its mid-position. However, the micro-switch which was opened to de-energize one of the solenoid coils, will remain open until rod 63 backs away (as the result of an opposite call from the room thermostat) from that limit position which brought about such opening of the micro-switch.

Means are also provided for adjusting the positions of the micro-switches relatively to their actuators, so that their timing can be changed as conditions may require. For this purpose, the switches are carried on arms 84, 85 which are supported by brackets 86, 87 pivoted, respectively, at 88, 89. By moving arms 84, 85 about their pivots, the switches (and in particular their actuators) are movable toward or from roller 79 so as to advance or retard the switch-opening engagement of roller 79 with either of the actuators.

At their free ends, arms 84, 85 carry angle plates 90, 91 which, as shown in Fig 3, are vertically slotted as at 92, 93, respectively. These slots are engaged by pins 94, 95 which project, eccentrically, from the rear of rotatable discs 96, 97 which are adjustable by means of screws 98, 99 projecting through the unit housing wall for convenient access. As shown in Fig. 1, these adjustment screws may be provided with calibrated escutcheon plates 100, 101. The notations "High" and "Pilot" above the adjustment screws will be understood to indicate that the right-hand screw 98 serves for the adjustment of the lowest permissible fuel supply and left-hand screw 99 for the highest permissible supply.

As shown in Figs. 1, 2 and 3, a knurled extension 102 of pump drive shaft 47 projects through the unit housing for access from the outside. By this means shaft 47 can be turned manually whenever desired, as to effect rapid priming of the pump and immediate fuel delivery for starting purposes. In connection with starting, it will also be noted that the wiring diagram includes a switch 103 which is in parallel with pot thermostat 20. As will be understood, switch 103 is used for starting the motor after the burner has been idle, at which time pot thermostat 20 is open.

In the light of the foregoing description of a preferred, illustrative embodiment of the invention, the following is claimed:

1. In a vaporizing oil burner mechanism, the combination of a single motor; a combustion air fan driven by the motor; a damper operable to vary the fan air passing to the burner; an oil supply line to the burner; a metering pump in said line; a hollow shaft driven by said motor; a radially adjustable crank pin member mounted for rotation by said hollow shaft; a drive connection from the crank pin member to the metering pump; a flexible coupling extending from the crank pin member, through the hollow shaft, and having an extension connection with the damper; a thermostatically controlled circuit; magnetic means operated by said circuit for effecting radial adjustment of said crank pin member; a pair of limit switches in said circuit; switch opening means for each of said switches; means associated with said extension connection for operating said switch opening means; and means for adjusting the positions of the limit switches in relation to said switch opening means.

2. In a vaporizing oil burner mechanism, the combination of a single motor; a combustion air fan driven by the motor; a damper operable to vary the fan air passing to the burner; an oil supply line to the burner; a metering pump in said line; a hollow shaft driven by said motor; a radially adjustable crank pin member mounted for rotation by said hollow shaft; a drive connection from the crank pin member to the metering pump; a flexible coupling extending from from the crank pin member, through the hollow shaft, and having an extension connection with the damper; a thermostatically controlled circuit; a pair of solenoid coils alternately energized by said circuit; armatures for said solenoid coils and connections therefrom to said crank pin member for effecting radial adjustment of said member inwardly in response to energization of one of said coils and outwardly in response to energization of the other of said coils; a pair of limit switches in said circuit; switch opening means for each of said switches; and means associated with said extension connection for operating said switch opening means.

3. In a vaporizing oil burner mechanism, the combination of a single motor; a combustion air fan driven by the motor; a damper operable to vary the fan air passing to the burner; an oil supply line to the burner; a metering pump in said line; a hollow shaft driven by said motor; a radially adjustable crank pin member mounted for rotation by said hollow shaft; a drive connection from the crank pin member to the metering pump; a flexible coupling extending from the crank pin member, through the hollow shaft, and having an extension connection with the damper; a thermostatically controlled circuit; a pair of solenoid coils alternately energized by said circuit; armatures for said solenoid coils and connections therefrom to said crank pin member for effecting radial adjustment of said member inwardly in response to energization of one of said coils and outwardly in response to energization of the other of said coils.

4. In a vaporizing oil burner mechanism, the combination of a single motor; a combustion air fan driven by the motor; a damper operable to vary the fan air passing to the burner; an oil supply line to the burner; a metering pump in said line; a shut-off valve in said line between the metering pump and the burner; resilient means for closing the shut-off valve when the metering pump is at rest, said means yielding to the pressure of the oil fed by the pump to open the valve when the pump is operating; a shaft driven by said motor; a radially adjustable crank pin member mounted for rotation by said shaft; a drive connection from the crank pin member to the metering pump; a coupling extending from the crank pin member and having an extension connection with the damper; a thermostatically controlled circuit; magnetic means operated by said circuit for effecting radial adjustment of said crank pin member; a pair of limit switches in said circuit; switch opening means for each of said switches; and means associated with said extension connection for operating said switch opening means.

5. In a vaporizing oil burner mechanism, the combination of a single motor; a combustion air fan driven by the motor; a damper operable to vary the fan air passing to the burner; an oil supply line to the burner; a metering pump in said line; a shut-off valve in said line between the metering pump and the burner; resilient means for closing the shut-off valve when the metering pump is at rest, said means yielding to the pressure of the oil fed by the pump to open the valve when the pump is operating; a shaft driven by said motor; a radially adjustable crank pin member mounted for rotation by said shaft; a drive connection from the crank pin member to the metering pump; a coupling extending from the crank pin member and having an extension connection with the damper; a thermostatically controlled circuit; and magnetic means operated by said circuit for effecting radial adjustment of said crank pin member.

6. In a vaporizing oil burner mechanism, the combination of a single motor and a primary circuit therefor; a combustion air fan driven by the motor; a damper operable to vary the fan air passing to the burner; an oil supply line to the burner; a metering pump in said line; a shut-off valve in said line between the metering pump and the burner; resilient means for closing the shut-off valve when the metering pump is at rest, said means yielding to the pressure of the oil fed by the pump to open the valve when the pump is operating; a shaft driven by said motor; a radially adjustable crank pin member mounted for rotation by said shaft; a drive connection from the crank pin member to the metering pump; a coupling extending from the crank pin member and having an extension connection with the damper; a thermostatically controlled secondary circuit; magnetic means operated by said circuit for effecting radial adjustment of said crank pin member; a combustion responsive switch in said primary circuit, biased to open in response to combustion failure; and a manual switch in parallel with said combustion responsive switch.

7. In a vaporizing oil burner mechanism, the combination of a single motor; a combustion air fan driven by the motor; a damper operable to vary the fan air passing to the burner; an oil supply line to the burner; a metering pump in said line; a hollow shaft driven by said motor; a radially adjustable crank pin member mounted for rotation by said hollow shaft; a drive connection from the crank pin member to the metering pump; a rod mounted for axial movement within the hollow shaft; a spring urging the rod in a direction away from the crank pin member; a bead chain coupling the rod to the crank pin member; and damper actuating means operatively associated with said rod.

8. In a vaporizing oil burner mechanism, the combination of a single motor; a combustion air fan driven by the motor; a damper operable to vary the fan air passing to the burner; an oil supply line to the burner; a metering pump in said line; a shut-off valve in said line between the metering pump and the burner; resilient means for closing the shut-off valve when the metering pump is at rest, said means yielding to the pressure of the oil fed by the pump to open the valve when the pump is operating; a shaft driven by said motor; a radially adjustable crank pin member mounted for rotation by said shaft; a drive connection from the crank pin member to the metering pump; a damper actuating member movable axially with respect to said shaft; a spring urging said damper actuating member in one direction axially of the shaft; and a connection between said damper actuating member and the crank pin member for moving the damper actuating member in the opposite direction.

9. In a vaporizing oil burner mechanism, the combination of a single motor; a combustion air fan driven by the motor; a damper operable to vary the fan air passing to the burner; an oil supply line to the burner; a metering pump in said line; a shut-off valve in said line between the metering pump and the burner; resilient means for closing the shut-off valve when the metering pump is at rest, said means yielding to the pressure of the oil fed by the pump to open the valve when the pump is operating; variable drive means coupling the motor to the pump, said drive means being adjustable to vary the rate of fuel delivery metered by the pump; means connecting a movable part of the said variable drive means with the damper; and thermostatically controlled means for coincidently adjusting both the said variable drive means and, through said connecting means, the damper.

HENRY S. WOODRUFF.

REFERENCES CITED

The following references are of record in the file of this patent:

UNITED STATES PATENTS

| Number | Name | Date |
|---|---|---|
| 572,255 | Hall | Dec. 1, 1896 |
| 1,345,652 | Tutein | July 6, 1920 |
| 1,425,519 | Ford | Aug. 15, 1922 |
| 1,437,664 | Larsen | Dec. 5, 1922 |
| 1,842,368 | Honiss | Jan. 19, 1932 |
| 1,883,735 | Hall | Oct. 18, 1932 |
| 2,104,587 | Gaugler | Jan. 4, 1938 |
| 2,245,834 | Sparrow | June 17, 1941 |

FOREIGN PATENTS

| Number | Country | Date |
|---|---|---|
| 29,937 | Great Britain | 1909 |